United States Patent [19]

Talbot

[11] 4,184,835

[45] Jan. 22, 1980

[54] MOLD APPARATUS

[75] Inventor: Howard M. Talbot, Pittsfield, Mass.

[73] Assignee: General Electric Company, Pittsfield, Mass.

[21] Appl. No.: 946,536

[22] Filed: Sep. 28, 1978

[51] Int. Cl.² .................. B29D 11/00; B29F 1/06
[52] U.S. Cl. .................................. 425/577; 425/808;
425/DIG. 5
[58] Field of Search .............. 425/808, DIG. 5, 577

[56] References Cited

U.S. PATENT DOCUMENTS

| | | | |
|---|---|---|---|
| 2,357,950 | 9/1944 | Goessling | 425/808 |
| 3,060,509 | 10/1962 | McCubbins | 425/DIG. 5 |
| 3,070,846 | 1/1963 | Schrier | 425/808 |
| 3,226,771 | 1/1966 | Szugda | 425/DIG. 5 |
| 3,894,710 | 7/1975 | Sarofeen | 425/808 |
| 4,082,245 | 4/1978 | Santos | 425/DIG. 5 |

FOREIGN PATENT DOCUMENTS 278509  1/1952  Switzerland ........................... 425/808

*Primary Examiner*—J. Howard Flint, Jr.
*Attorney, Agent, or Firm*—Salvatore C. Mitri; William F. Mufatti

[57] ABSTRACT

A mold apparatus is provided having a stationary injection mold block and a movable compression mold block. A female mold member is formed in the injection mold block whereas the compression mold block contains a movable male mold member so that when the injection and compression mold blocks are placed in an operative position, a mold cavity is defined by and between the female and male mold members. Means are provided to feed a shot of thermoplastic resin into the mold cavity and, at a predetermined time in the mold cycle, move the male mold member into co-acting, mating relationship within the female mold member so that the thermoplastic part obtained is produced by concurrently employing both injection and compression molding principles.

8 Claims, 3 Drawing Figures

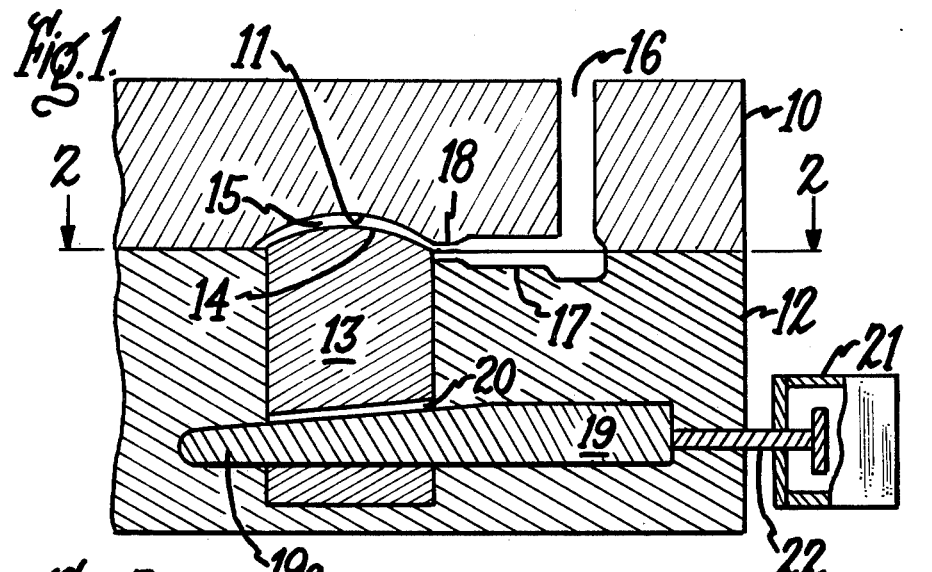
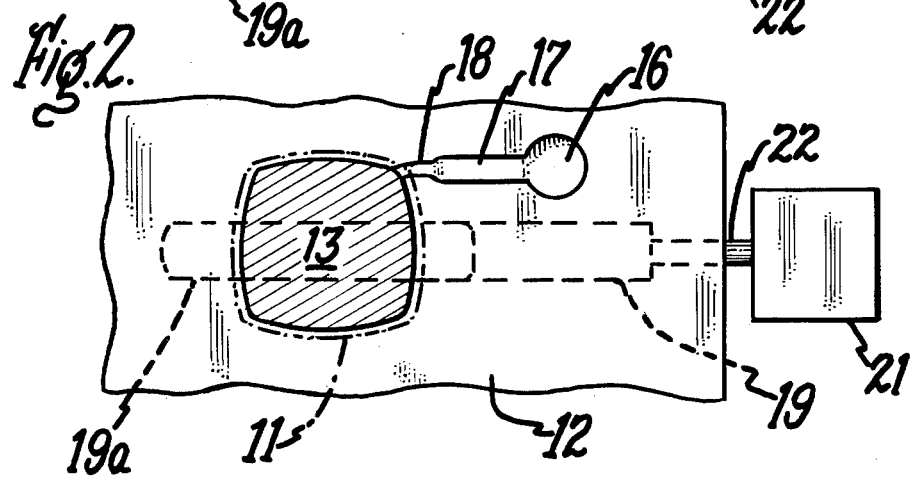
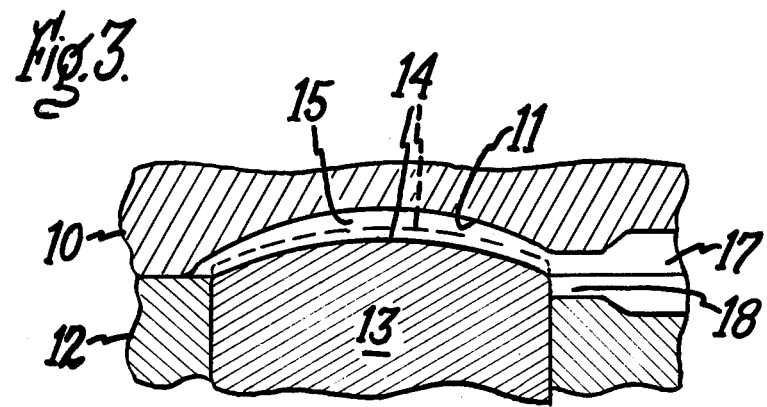

MOLD APPARATUS

This invention relates to a mold apparatus for producing molded parts from thermoplastic resins by means of both injection and compression molding.

BACKGROUND OF THE INVENTION

Injection molding apparatus have been used to produce molded parts from thermoplastic resins such as polyolefins, polyvinyl chloride, polyesters, polycarbonates, and the like. With these thermoplastic resinous materials, typical injection molding temperatures employed are on the order of about 500°–600° F. and typical molding pressures are about 3,000 to 16,000 psi. While injection molding apparatus are used to successfully produce many types of plastic parts, they are not particularly suitable to produce relatively thin parts of less than about 0.50" as these thin parts typically require secondary finishing operations or are not acceptable as they contain blemishes or distortions due to non-uniform setting of the thermoplastics material.

Compression molding apparatus have also been used to produce molded parts from theromplastic resins, the molds employed generally being large and bulky as the parts produced therefrom are likewise generally large and bulky. With compression molding, lower pressures of about 1,000–3,000 psi can be used, but longer mold cycle times are needed to obtain thorough set of the resins. Thus, the molds employed must be strong enough to withstand these pressures and the elevated temperatures to accomodate the prolonged set periods. If relatively thin parts are to be produced such as those having cross sections less than about 1.0", they are generally not uniform or require secondary finishing operations.

SUMMARY OF THE INVENTION

It has now been found that molded parts having relatively thin cross sections on the order of about 0.200–0.140" can be made from thermoplastic resins so that the parts obtained are free from distortions and blemishes, are optically clear and do not require secondary finishing operations. These desirable properties are obtained by using the mold apparatus of the invention which combines the features of injection molding with those of compression molding.

In general, the mold apparatus of the invention comprises a stationary, injection mold block in which there is formed a female mold member; a movable compression mold block containing a movable male mold member so that when said mold blocks are in an operative position, a mold cavity is defined by and between said female mold member and said male mold member; means to injection feed a thermoplastic resin into the mold cavity; and, means to actuate said male mold member during the last 20–25% of the mold cycle.

The mold apparatus of the invention permits small parts having relatively thin cross sections such as optical lenses used for sun glasses, safety glasses, and the like, to be molded from thermoplastic resins and be free from distortions and blemishes. Although these parts have been made by injection molding thermoplastic resins, usually about ⅛" of the perimeter portion of the lenses have been distorted due to non-uniform set of the molded part; that is, the thermoplastic resin in this outer perimeter portion of the lens cooled and set at a faster rate than the inner portion. Such lenses can now be made free from distortions and blemishes by employing the mold apparatus of the invention wherein 75–80%, preferably 90–95%, of the first portion of the mold cycle is accomplished by means of injection molding and 20–25%, preferably 5–10% of the last portion of the mold cycle is accomplished by means of compression molding co-acting concurrently with injection molding.

DETAILED DESCRIPTION OF THE INVENTION

The invention will become more clear when considered in light of the ensuing description taken together with the accompanying drawing wherein the figures illustrate preferred embodiments thereof and wherein:

FIG. 1 is an elevation view in section of the mold apparatus of the invention, portions of the mold blocks thereof being eliminated for clarity;

FIG. 2 is a plan view of the mold apparatus shown in FIG. 1 taken substantially on the line 2—2 of FIG. 1; and, FIG. 3 is an exaggerated view of the mating and co-acting members of the mold apparatus shown in FIGS. 1 and 2.

As shown in FIGS. 1 and 2, the mold apparatus comprises a stationary mold block 10 in which there is defined a female mold member 11, and a movable mold block 12 containing a solid, cyclindrical male mold member 13. In this embodiment of the mold apparatus and as shown more clearly in FIG. 3, female mold member 11 is formed to be concave and the upper portion 14 of male mold member is convex so that when stationary mold block 10 and movable mold block 12 are placed in their operative positions, a mold cavity 15 is formed between female mold member 11 and the upper part 14 of male mold member 13.

Thermoplastic resin material is fed to mold cavity 15 from a suitable source of supply (not shown) through associated means such as sprue 16, runner 17 and gate 18.

At a predetermined time in the mold cycle, male mold member 13 is urged upwardly into the mold cavity 15 by means of cam bar 19 which slidably engages the lower end of male mold member 13 through cam slot 20. Cam bar 19 is horizontally reciprocated back and forth within cam slot 20 by suitable means such as hydraulic cylinder 21 and associated piston 22. For the embodiment shown, the tapered end 19a of cam bar 19 is at an angle of about 10 with respect to the vertical axis of the male member 13 and mold cavity 15 is of a size to accept a shot of thermoplastic resin having an initial cross sectional thickness of about 0.150".

In operation, a shot of thermoplastic resin at a temperature of about 500°–550° F. is injected into mold cavity 15 from a supply source (not shown) through sprue 16, runner 17 and gate 18. When the injection molding cycle is about 90–95% complete, hydraulic cylinder 21 is actuated by conventional means such as a solonoid switch, to horizontally urge the tapered end 19a of cam bar 19 further into cam slot 20 by means of piston 22. As tapered end 19a moves into cam slot 20, male mold member 13 is thrust upwardly further into mold cavity 15 a distance on the order of about 0.010"–0.020", preferably about 0.017", to thereby complete the last 5–10% of the molding cycle using both injection molding and compression molding. Movement of male mold member 13 further into mold cavity 15 is shown by dotted lines in FIG. 3. Thus, the last portion of the mold cycle is accomplished by a combination of injection and compression molding to further reduce the cross sectional thickness of the slug of thermoplastic resin in the mold cavity 15 from about 0.150" to about 0.140"–0.138", the slug being retained under compression until it has cooled sufficiently to be removed from the mold.

By using the mold apparatus of the invention, the principles of injection molding are combined and balanced with those of compression molding to produce thermoplastic parts such as lenses having uniform optical integrity; i.e., the lenses are free from optical distortions, and which do not require any secondary finishing operations.

While the mold apparatus of the invention has been described with respect to producing an optical lens, it should be understood that this has been by way of illustration and not limitation as the mold apparatus can be used with equal facility to produce other items by using appropriate male and female mold members to define a desired mold cavity, adjusting the upward stroke of male mold member, and the like. For example, the principles of the mold apparatus of the invention can be used to produce such items as prescription lenses, eliminate sinks, voids and air bubbles in parts having relatively thick cross sections such as greater than about 1.0", and the like, by beginning the mold cycle of the part with injection molding and applying compression molding during the last part of the mold cycle so that the thermoplastic material cools and sets uniformly.

What is claimed:

1. A mold apparatus for use in molding parts from thermoplastic resins, said mold apparatus comprising:
   (a) a stationary injection mold block having formed therein a female mold member;
   (b) a movable compression mold block containing a movable male mold member, such that when said injection and compression mold blocks are in an operative position, a mold cavity is defined by and between said female and male mold members;
   (c) means to injection feed a thermoplastic resin into said mold cavity; and,
   (d) means to actuate the male mold member in said compression mold block such that it further co-acts with said female mold member during about the last 20–25% of a mold cycle.

2. The mold apparatus of claim 1 wherein said female mold member is concave and the upper surface of said male mold member is convex such that the mold cavity formed therebetween defines an optical lens.

3. The mold apparatus of claim 1 wherein said male mold member is actuated to co-act with said female mold member during about the last 5–10% of said mold cycle.

4. The mold apparatus of claim 1 wherein said male mold member is vertically disposed beneath said female mold member and has a cam slot formed intermediate its ends to slidably receive the tapered end of a cam bar therethrough, said cam bar being actuated to horizontally reciprocate its tapered end within said cam slot such that said male member is moved upwardly and downwardly into and out of co-acting, mating relation with said female mold member.

5. A mold apparatus for use in molding optical lenses from thermoplastic resins, said mold apparatus comprising:
   (a) a stationary injection mold block having formed therein a concave female mold member;
   (b) a movable compression mold block containing a vertically movable male mold member, the upper surface of said male mold member being convex such that when said injection and compression mold blocks are in an operative position, an optical lens mold cavity is defined by and between said female and male mold members, said male mold member having a cam slot formed intermediate its ends and said mold cavity being of a size sufficient to receive a shot of thermoplastic resin therein having a cross sectional thickness of about 0.200–0.150 inch;
   (c) a horizontally disposed cam bar having a tapered end, said tapered end being slidably engaged in said cam slot;
   (d) means to injection feed a shot of thermoplastic resin into said mold cavity; and,
   (e) means to horizontally reciprocate the tapered end of said cam bar within said cam slot such that said male mold member is moved upwardly into co-acting, mating relationship within said female mold member during about the last 20–25% of a mold cycle.

6. The mold apparatus of claim 5 wherein said male member is moved upwardly a distance of about 0.010–0.020 inch such that the cross sectional thickness of a slug of thermoplastic resin within said mold cavity is reduced to about 0.140–0.138 inch and is held under compression until cooled.

7. The mold apparatus of claim 5 wherein the tapered end of said cam bar forms an angle of about 1° with respect to the vertical axis of said male mold member.

8. The mold apparatus of claim 5 wherein said male mold member is moved upwardly into co-acting, mating relationship within said female mold member during about the last 5–10% of said mold cycle.

* * * * *